No. 762,035. PATENTED JUNE 7, 1904.
W. F. FOLMER.
MAGAZINE FILM HOLDER.
APPLICATION FILED MAR. 11, 1904.
NO MODEL. 2 SHEETS—SHEET 1.
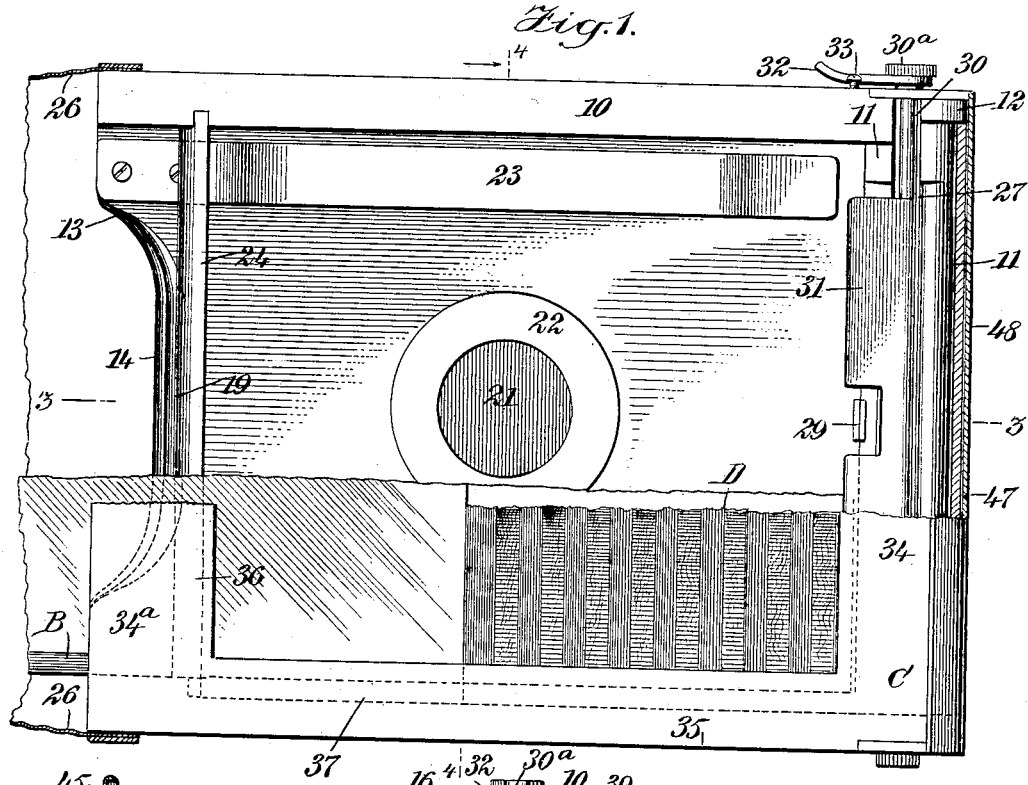
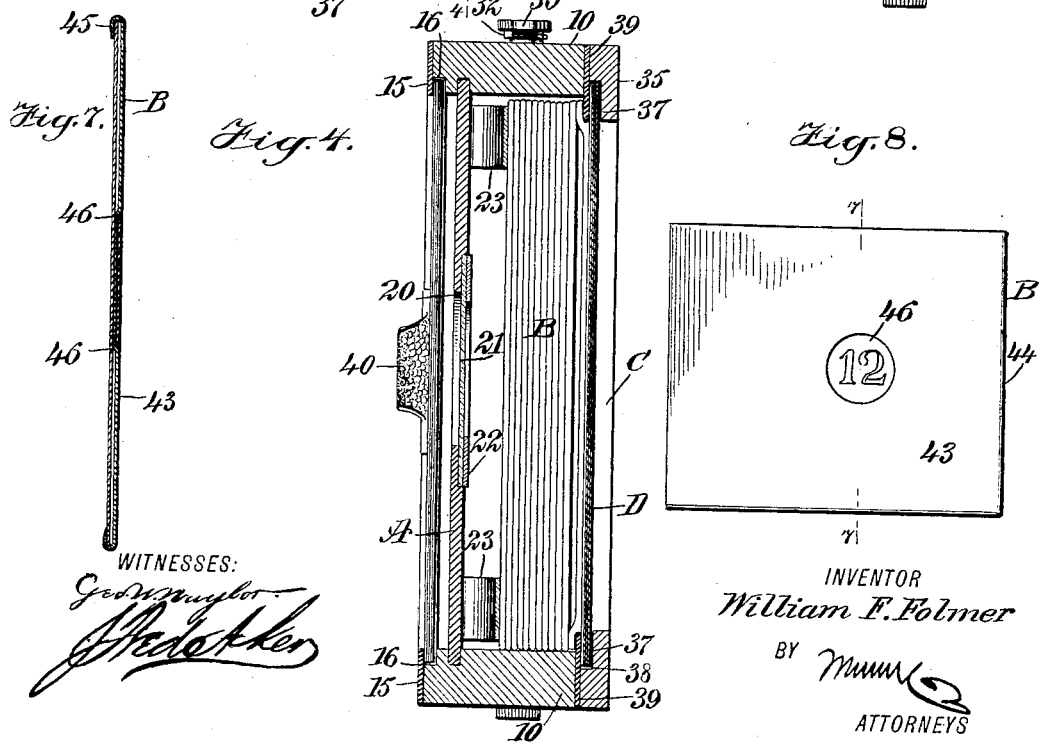
WITNESSES:
INVENTOR
William F. Folmer
BY
ATTORNEYS

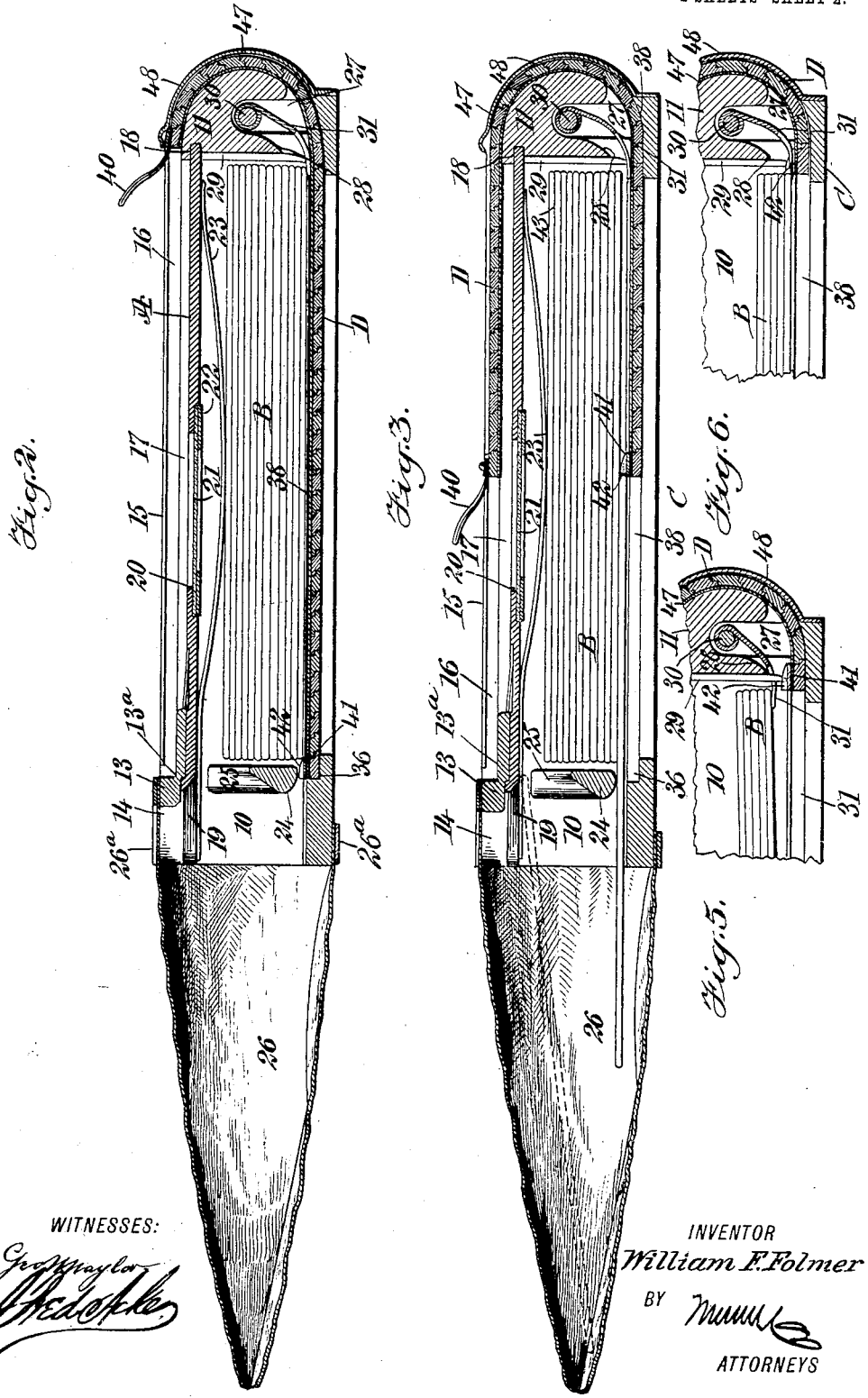

No. 762,035. Patented June 7, 1904.

UNITED STATES PATENT OFFICE.

WILLIAM F. FOLMER, OF NEW YORK, N. Y.

MAGAZINE FILM-HOLDER.

SPECIFICATION forming part of Letters Patent No 762,035, dated June 7, 1904.

Application filed March 11, 1904. Serial No. 197,634. (No model.)

*To all whom it may concern:*

Be it known that I, WILLIAM F. FOLMER, a citizen of the United States, and a resident of the city of New York, borough of Manhattan, in the county and State of New York, have invented a new and Improved Magazine Film-Holder, of which the following is a full, clear, and exact description.

The purpose of my invention is to provide a magazine-holder for photographic cameras constructed to hold cut films in predetermined quantities and a shutter for the holder which when opened exposes the front film and which when closed forces the exposed film and its carrier into a bag connected with the body of the holder, wherein a film and its carrier can be readily manipulated for location at the back of the mass of unexposed or previously-exposed films in the holder.

Another feature of the invention is to provide means exteriorly operated to so place the stack or mass of films and their carriers in the holder that when desired the shutter may be opened and closed without acting upon any one of the film-carriers.

A further feature of the invention is to provide each film-carrier with a number upon its back, such numbers reading, for example, from "1" to "12," and to provide an opening at the back of the holder covered with a suitably-colored glass or transparent material, at which opening the number of the holder containing the last exposed film is exposed when the carrier is placed in position at the rear in the holder, thus indicating to the operator at any time the number of unexposed films in the holder remaining from the given number with which the holder was loaded.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a sectional rear elevation of the improved film-holder. Figs. 2 and 3 are longitudinal horizontal sections taken practically on the line 3 3 of Fig. 1, the view in Fig. 2 showing the shutter closed and all of the plates in normal position and the view in Fig. 3 illustrating the shutter in the act of closing and as forcing a carrier for the last exposed film into the shifting-bag of the holder. Fig. 4 is a transverse section taken practically on the line 4 4 of Fig. 1. Fig. 5 is a partial longitudinal section taken at one end of the holder, illustrating the lifting device for the plate-holders as lifting them, so as to carry them out of the path of the shutter when closing; and Fig. 6 is a view similar to Fig. 5, but the plate-carriers are shown in their normal position and the shutter as fully opened and projections from the shutter in engagement with the foremost film-carrier to shift the same into the shifting-bag when the shutter is closed. Fig. 7 is a transverse section through a film-carrier, taken on the line 7 7 of Fig. 8; and Fig. 8 is an outer or rear face view of the film-carrier.

The frame of the holder consists mainly of the following parts—namely, two parallel side sections 10 and a head cross-bar 11, the outer surface of which is rendered more or less segmental, and at each end of the outer surface of said head cross-bar 11 a correspondingly-shaped rib 12 is formed, so that a space is provided between the outer faces of the said ribs and the outer face of the body of the said head cross-bar 11, and this space is provided for a purpose to be hereinafter mentioned. At the opposite ends of the said side pieces 10 and at the outer face of the holder a cross-bar 13 is secured to the said side pieces 10, and this cross-bar is provided with an extension 13ª at its forward inner edge, as is shown in Figs. 2 and 3, the said extension 13ª being usually formed by a rabbet made in the outer face of the said cross-bar 13. The said cross-bar 13 is provided, preferably, with a concavity 14 at its central portion, more or less inwardly and forwardly curved, so as to admit of the manipulation of the rear observation-slide A, to be hereinafter described.

The inner faces of the side pieces 10 at the outer face of the holder are reduced in thickness to form opposing channels 16, the forward or inner faces of which are on the same plane as the exterior surface of the body portion of the head cross-bar 11, and the outer faces of the ribs 12 are on the same plane with the outer faces of the unreduced portions of the rear edges of the said side bars 10. The aforesaid channels 16 are formed by securing plates 15, of metal, on the unreduced outer edges of the side pieces 10, which plates extend inward and terminate substantially flush with the inner upper edges of the said side pieces or bars 10.

The rear observation-slide A, above referred to, has movement in slideways 17, produced in the inner faces of the side bars 10 of the frame at a point below the channels 16, and the slideways, grooves, or channels 17 are in alinement with the bottom portion of the cross-bar 13 and extend to that end of the side bars at which the said cross-bar 13 is located. Furthermore, a continuation of the channels, grooves, or slideways 17 is produced in the inner face of the head cross-bar 11, as is shown in Figs. 2 and 3, to receive the inner end of the rear observation-slide A. This rear observation-slide A beneath the cross-bar 13 is provided with a central concaved surface 19, corresponding to the surface 14 formed in the said cross-bar 13, so that the fingers of the operator can readily find access into the interior of the body of the holder, which is open at that end at which the cross-bar 13 is located, but is closed practically at the opposite end by the head cross-bar 11.

A central opening 20 is made in the observation-slide A, and this opening 20 is covered by a transparent pane or panel 21 of suitable color, held in place usually by an interiorly-located washer 22, as is shown in Figs. 2 and 3, and through this panel the operator will have a view of the interior of the holder without exposing the films to the rays of light.

Springs 23 are located on the inner face of the rear observation-slide A, being secured to the said slide at the open end portion of the body of the holder, and these springs are then bowed forwardly between their end portions, so as to bring suitable bearing or pressure upon the film-carriers B, to be hereinafter more particularly referred to.

A hood or bag 26, made of any flexible material—a fabric, for example—is secured to the holder at what is normally its open end by means of suitable clamps 26ª or any equivalent means, and when the bag or receptacle 26 has been attached to the holder the open end thereof at which the connection is made is rendered light-tight, and the carriers B for the films after they have been passed out from the body of the holder are manipulated in this bag or receptacle 26 in such manner that the carrier containing the exposed film may be placed out of the way and practically at the rear of those carriers which contain films to be exposed.

In the forward portion of the head cross-bar 11 a longitudinal chamber 27 is produced, the inner forward edge 28 of which chamber is curved, as is likewise the outer edge, and where these curvatures take place the walls of the chamber are reduced, so as to render the head cross-bar 11 of less transverse depth at these points, and at the central portion of the inner face of the head cross-bar 11 a guide-plate 29 is preferably countersunk, which guide-plate extends beyond the reduced portion of the inner wall of the said chamber 27, as is shown in Figs. 2 and 3, and preferably the forward or inner end of this guide-plate 29 is more or less beveled at its outer face, as is shown in the same views. This guide-plate 29 acts to prevent the carriers B for the films possibly entering the chamber 27, and this chamber 27 is specially adapted to contain a lifting or shifting device for the film-carriers B while said carriers are in the body of the frame. Such device consists of a shaft 30, journaled in the end portions of the head cross-bar 11 and provided at its ends with nuts 30ª or their equivalents, which are simply used to hold the shaft 30 in place. This shaft 30 is mounted to turn, and the said shaft carries a shifting or lifting flat arm 31, the forward or free end whereof is curved, so as to extend in front of the foremost film-carrier B when the mass of film-carriers are placed in the frame, as is shown in Fig. 2. This shifting or lifting plate 31 is provided with an opening, so that it may be readily operated without interference on the part of the guide-plate 29, as the said opening is opposite the said guide-plate. The shaft 30 is operated, preferably, through the medium of an outer attached arm 32, (shown in Fig. 1,) which is limited in its movement by a stop 33, attached to the outer face of one of the side bars 10; but the said stop 33 is not absolutely necessary and is there for convenience, limiting the movement of the shifting plate or arm 32.

Normally the lifting or shifting plate 31 is located as shown in Fig. 2, the location being such as not to interfere with any withdrawal action of the carriers B; but sometimes it is desirable that the front of the holder shall be exposed without interfering with the film-carriers B. Ordinarily, however, when the device employed to cover the front of the holder is opened for exposure and is then closed as such device is closed the carrier B containing the exposed film will be automatically slid into the bag or receptacle 26, Fig. 3 illustrating the cover device for the carrier acting in the manner above described.

In Fig. 6 the shifting or lifting plate 31 is shown also in its normal or inactive position, and in Fig. 5 this plate 31 is shown as having shifted the film-carriers in direction of the rear of the holder.

The carriers B are prevented from leaving the holder until purposely removed by locating at the open end of the holder a cross-bar 24, and a space sufficient to admit of the exit of a plate or film carrier is provided between the forward portion of the said cross-bar and the forward portion of the holder. Preferably the rear longitudinal edge of this cross-bar 24 is concaved, as shown at 25, in order that the rear observation-slide A may be readily grasped for removal when desired.

An auxiliary frame C is secured to the front of the main frame, which has been described. This auxiliary frame consists of an end member 34, which is adapted to extend over a portion of the head cross-bar 11, an opposing transverse end member $34^a$, which extends over the cross-bar 24, and side bars 35. This auxiliary frame C is attached to the main frame in any desired manner.

At what may be termed the "delivery" end of the main frame a rabbet 36 is formed in the inner side of the end bar $34^a$ of the auxiliary frame C at the inner longitudinal edge of the said bar, and this rabbet is continued along the inner under side portions of the side bars 35, as is shown at 37, and at what may be termed the "head" end of the said holder the under face of the end bar 34 of the auxiliary frame C is cut away, so as to conform to the contour of the head cross-bar 11 of the main frame where the two frames connect, as is shown in Figs. 2, 3, 5, and 6.

On the inner face of each side bar 35 of the auxiliary frame C a metal plate 39 is secured, which extends over the rabbeted portions 37 of the said side bars, forming thereby slideways 38, and these slideways correspond to the rabbeted portion 36 of the end bar $34^a$, as is illustrated in Figs. 2 and 3.

A sectional rolling cover D is provided for the front of the holder, and this rolling cover, when it is in its normal position closing the front of the holder, has one end seated in the rabbeted portion 36 of the end bar $34^a$ of the auxiliary frame C, as is shown in Fig. 2. The side edges of this rolling sectional cover are located in the slideways 38, in which the cover freely moves, and the said cover is continued around the head cross-bar 11 of the main frame, as is shown in Figs. 2, 3, 5, and 6. When the said cover is in the closed position, (shown in Fig. 2,) the rear end of the cover will be at a point opposite the slideways 16 at the back of the main body of the frame, in which slideways or channels 16 the said cover is adapted to have movement when opened, and in order that the said cover may be drawn from a closed to an open position and returned again to a closed position in a convenient manner a tab 40 of suitable material is attached to the rear end portion of the said cover, as is shown in Figs. 2 and 3. At what may be termed the "inner" end of the said sectional rolling cover, or that end which is adapted to enter the rabbeted portion 36 of the auxiliary frame C when the cover is closed, I preferably support the said cover at this part by securing a transverse bar 41 to its under side, and this cross-bar 41 is provided with lugs 42, one at each end. As the cover is moved from open to closed position or the reverse the plates 39 are located between the lugs 42 and the side edges of the cover, so that the lugs extend inward or rearward beyond the guide-plates 39.

The carriers B for the films each consist of a plate 43, having one end 44 and two sides 45 turned over to form slideways or guides for the film which is introduced into the slideways or slides at the open end of the carrier. At a predetermined point in each plate 43 constituting a carrier a depression 46 is made, the said depression being so formed that the well portion thereof will be at the back of the body-plate of the carrier. In this depression or well 46 I secure in any suitable or approved manner a label, and on this label a numeral is produced. When twelve film-carriers, for example, are to be placed in a holder, these labels will be numbered consecutively from "1" to "12," inclusive. These labels when placed in the said depressions or wells are flush with the back faces of the body-plates of the carrier or are slightly depressed, so as to be, as it were, countersunk, so that when the back of the body-plate of a carrier is subjected to friction by contact with another carrier or with any other object the label will not become damaged or destroyed. These labels are so placed on the carriers that when a carrier having had its film exposed is located at the rear of the mass of carriers in the holder the label will be opposite the non-actinic window or panel 17 in the rear observation-slide A. Preferably the numbers on the labels are produced in black, and the surrounding color of each label is of a non-actinic nature, preferably the same color as that employed for the observation-window 17 in the observation-slide A.

The end channel 47, in which the cover has movement around the head cross-bar 11, is obtained by placing a guard-plate 48 at the curved portion of the head cross-bar 11, which guard-plate 48 is screwed or otherwise secured to the lugs 12 at the end portions of the cross-bar 11 and to the outer edges of the side members 10 of the main frame at the back, the plate 48 preferably being made to meet the side guide-plates 15 at the rear.

In operation the carriers B are loaded with films and are arranged to read from "1" to "12", for example, from front to rear. These carriers are then placed in the body of the frame, the cover D having been opened. The cover D is then closed, and the springs 23, acting on the rearmost of the mass of carriers, tend to force the said carriers forward, and the opening in the auxiliary frame C, which is disclosed when the cover is opened, is of such dimensions that the side edges of the carriers will bear against the inner side edges of the auxiliary frame, so that the springs 23 may be very strong, and yet cannot force a carrier out through the opening in the auxiliary frame.

After the holder has received its charge of film-carriers the cover D is closed, being brought to the position shown in Fig. 2, and the holder is then in position to be placed at the rear of the camera-box.

When an exposure is to be made, it is simply necessary for the operator to grasp the tab 40 and draw the cover D rearward and in direction of the end carrying the bag, hood, or receptacle 26, whereupon the said cover will travel in the grooves 16, and when the rear end of the cover reaches the ends of the grooves 16 adjacent to the bag 26 the opening in the auxiliary frame C will have been fully uncovered and the film in the first carrier fully exposed. After the exposure of this film has been made the cover is forced again to the front, closing the front opening in the holder, and as the cover is thus forced to the front the lugs or projections 42 at the forward end of the cover will engage with the end of the carrier containing the exposed film and will force this carrier into the bag 26, whereupon the operator, grasping the bag from the outside and at the same time the carrier in the bag, will direct the carrier to the rear of the holder, as is shown by dotted lines in Fig. 3, and will then force the carrier in again between the springs 23 and the rearmost carrier having an unexposed film. Thus the second carrier with an unexposed film is brought to the front to be exposed the next time the cover is opened, while the carrier having the last exposed film will be at the rear of the holder and its number will be visible through the observation-window of the observation-slide A, thus enabling the operator at any time to determine just how many unexposed films remain in the holder.

It will be observed that when a carrier B is forced out from the holder into the bag 26 it passes between the partition 25 and the inner face of the auxiliary frame C. With reference to the shifting plate 31 it is frequently desirable that the cover D should be operated without any action on the carriers B. When it is desired, therefore, to operate the cover D backward and forward independently of the carriers B, it is simply necessary to turn the shaft 30 until the curved lower edge of the shifting plate 31 shall have forced the bulk or mass of film-carriers B to the rear and out of the path of the projections or lugs 42 at the forward end of the said cover as the cover is carried to closed position. After the cover has been closed it is simply necessary to carry the shifting plate 31 forward, whereupon the springs 23 will act to restore the carriers B to their normal position.

Having thus described my invention, I claim as new and desire to secure by Letters Patent—

1. A magazine-holder for cameras, provided with a rear observation-slide, an opposing rolling sectional cover, guides for both of the said parts, and a bag or receptacle at one end of the said holder, which end is open for the passage of the contents of the holder into the said bag, as described.

2. A magazine-holder for cameras, having one end open, a bag or receptacle at the open end, a sectional rolling cover for the front of the holder, the said holder being provided with an exit-passage for its contents, one by one, which exit-passage is located adjacent to the cover, and means for transferring one of the contents of the holder to the said bag, automatically as the said cover is closed.

3. In a magazine-holder for cameras, a roll-cover for the front of the holder, and means carried by the cover for controlling the movement of the foremost plate or film contained in the holder, as described.

4. In a magazine-holder for cameras, a series of carriers for plates or films located in the said holder, an exit for the foremost carrier located at one end of the said holder, a roll-slide adapted to normally close the front of the carrier, and extensions from the said slide, which engage the foremost carrier and force the same outward at one operation of the cover as the cover is closed, as described.

5. In a magazine-holder for cameras, a sliding cover for the front of the holder, having a projection from its inner face, and a lifting device located within the said holder, operating to and from the said cover, all arranged for the purposes set forth.

6. In a magazine-holder for cameras, a back provided with a non-actinic transparent panel therein, the said holder being open at one end, a bag at the open end of the said holder, and a plate or film carrier adapted to be located in the holder and provided with a countersunk numbered section as described, which numbered section is adapted to be opposite the said non-actinic panel, as and for the purpose set forth.

7. A magazine-holder for cameras, open at one end and provided with a bag at said end, a sliding cover for the front of the holder, and means carried by the said cover, for automatically transferring a plate or film carrier from the holder to the bag at one operation of the cover, as set forth.

8. A magazine-holder for cameras, open at one end and provided with a bag at said end, a sliding cover for the front of the holder, and means carried by the said cover for automatically transferring a plate or film carrier from a holder to the bag at one operation of the cover, and a shifting device located within the said holder, acting independently of the cover, and arranged to carry the plate or film carriers which may be contained in the said holder out of the path of action of the said cover, as described.

In testimony whereof I have signed my name to this specification in the presence of two subscribing witnesses.

WILLIAM F. FOLMER.

Witnesses:
J. FRED ACKER,
JNO. M. RITTER.